US011513709B2

(12) United States Patent
Danilov et al.

(10) Patent No.: US 11,513,709 B2
(45) Date of Patent: Nov. 29, 2022

(54) DATA REBALANCING AFTER A SCALE-OUT EVENT IN A DATA STORAGE SYSTEM

(71) Applicant: EMC IP Holding Company LLC, Hopkinton, MA (US)

(72) Inventors: Mikhail Danilov, Saint Petersburg (RU); Johannes Altaye, Dumfries, VA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 7 days.

(21) Appl. No.: 17/144,314

(22) Filed: Jan. 8, 2021

(65) Prior Publication Data

US 2022/0222002 A1  Jul. 14, 2022

(51) Int. Cl.
*G06F 3/06* (2006.01)

(52) U.S. Cl.
CPC .......... *G06F 3/0644* (2013.01); *G06F 3/0619* (2013.01); *G06F 3/0673* (2013.01)

(58) Field of Classification Search
CPC ..... G06F 3/0644; G06F 3/0619; G06F 3/0673
See application file for complete search history.

(56) References Cited

U.S. PATENT DOCUMENTS

2019/0294339 A1\* 9/2019 Bolkhovitin .......... G06F 3/0688
2019/0303006 A1\* 10/2019 Wozniak ................ G06F 3/067

\* cited by examiner

*Primary Examiner* — Edward J Dudek, Jr.
(74) *Attorney, Agent, or Firm* — Amin, Turocy & Watson, LLP

(57) ABSTRACT

The described technology is generally directed towards rebalancing fragments (components) of a protection group among storage entities (e.g., nodes or disks) based on affinity levels in response to a scale out event that expands the storage entities e.g., nodes or disks) of a system. Affinity levels (e.g., maintained in an affinity matrix) represent dependency relationships between the storage entities with respect to storing distributed protection group fragments. A protection group's components are rebalanced based on the new storage entities such that the affinity level between any pair of storage entities is approximately the same as any other pair. In the event of a storage entity failure, as a result of the affinity-based distribution of the protection group components needed for data recovery, a larger number of the other storage entities can be involved in the data recovery. The technology facilitates improved capacity load balancing and faster data recovery.

20 Claims, 13 Drawing Sheets

DATA REBALANCING AFTER A SCALE-OUT EVENT IN A DATA STORAGE SYSTEM

TECHNICAL FIELD

The subject application generally relates to data storage, and, more particularly, to distributing data to facilitate data recovery performance, and related embodiments.

BACKGROUND

Conventional data storage techniques can store data in one or more arrays of data storage devices. As an example, data can be stored in an ECS (formerly known as ELASTIC CLOUD STORAGE) system, such as is provided by DELL EMC. Such data storage systems distribute data within a storage cluster in a way that tolerates a maximal number of hardware failures.

As one example, maintaining mirrored copies of data is one technique that can be used. As a further example, ECS uses erasure coding for data protection. With erasure coding, a data portion (e.g. a chunk of user data) is divided into k (e.g. 12) data fragments. Encoding is performed upon the data fragments, with the result of encoding being a set of m (e.g. 4) coding fragments. The resulting k+m fragments make up a protection group (also referred to as a protection set), and are each stored to different storage entities (nodes, or storage devices such as hard disks and/or solid state drives). The way the coding is done assures that the system can tolerate the loss of any m fragments. Lost fragments are recovered via a decoding operation using the data maintained on the other storage entities.

Contemporary storage systems including ECS implement capacity load balancing techniques to assure approximately even distribution of data across storage entities. However, load balancing can result in certain protection groups being concentrated among a relatively small subset/group of the storage entities, with other protection groups being concentrated among other relatively small subsets/groups of the storage entities. Such a grouping effect can adversely slow down recovery, because, if a node/disk fails, the node's or disk's groupmates that contain the data needed for recovery are heavily involved in the recovery operation, while the nodes/disks that are not in that group are barely (if at all) involved. This remains true when new protection groups are stored, as well as when a scale out event occurs in which additional storage entities are added to a system, such new nodes to a node cluster, which triggers rebalancing of data to the added storage entities.

BRIEF DESCRIPTION OF THE DRAWINGS

The technology described herein is illustrated by way of example and not limited in the accompanying figures in which like reference numerals indicate similar elements and in which.

DETAILED DESCRIPTION

Figure 1:
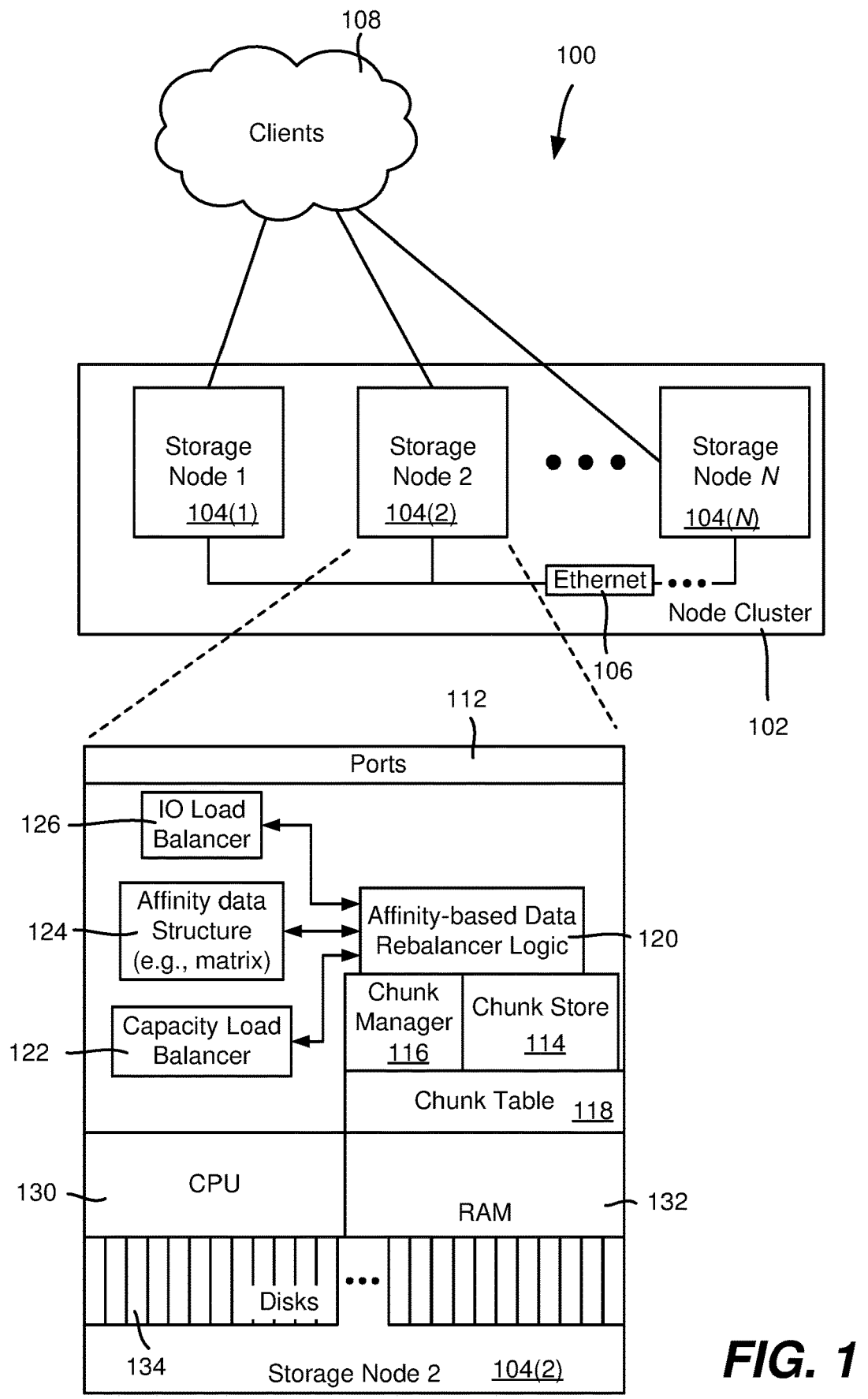
FIG. 1 is an example block diagram representation of part of a data storage system including nodes, in which affinity-based data rebalancing logic is used to redistribute protection groups, in accordance with various aspects and implementations of the subject disclosure.

Aspects of the technology described herein are directed towards rebalancing of a protection group (via data redistribution) in a storage system in response to a scale out event that adds storage entities to legacy storage entities. As will be understood, the technology described herein operates to rebalance individual protection groups (protected data portions, also referred to as protection sets) in a way that helps to accelerate the data recovery process by considering the mutual disposition of the protection groups during the rebalancing. As a result, after a hardware failure, data regeneration workload may be distributed between cluster nodes more evenly than with standard rebalancing solutions.

In general, a protection group creates affinity (dependency relationships) between the storage entities that store the protection group's distributed components (mirrored data portions, or data and coding fragments). The affinity levels between pairs of storage entities, which indicates the mutual dependence between nodes/storage drives in a cluster with respect to protection groups and recovery data, is tracked in the data storage system as used during rebalancing following a scale-out event. As will be understood, the affinity-based data rebalancing described herein operates to reduce the grouping effect that otherwise can concentrate data protection group recovery among a relatively small group of storage entities (nodes or disks).

More particularly, when a protection group needs to be rebalanced, the affinity between the storage entities is considered when selecting storage entities, in an attempt to have the various storage entities in the cluster have similar levels of affinity to one another. Each node may independently manage affinity of the storage entities in the data storage system; in one implementation a node manages affinity for the protection groups that the node produces.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

Reference throughout this specification to "one embodiment," "an embodiment," "one implementation," "an implementation," etc. means that a particular feature, structure, or characteristic described in connection with the embodiment/implementation is included in at least one embodiment/implementation. Thus, the appearances of such a phrase "in one embodiment," "in an implementation," etc. in various places throughout this specification are not necessarily all referring to the same embodiment/implementation. Furthermore, the particular features, structures, or characteristics may be combined in any suitable manner in one or more embodiments/implementations.

Aspects of the subject disclosure will now be described more fully hereinafter with reference to the accompanying drawings in which example components and operations are shown. In the following description, for purposes of explanation, numerous specific details are set forth in order to provide a thorough understanding of the various embodiments. However, the subject disclosure may be embodied in many different forms and should not be construed as limited to the examples set forth herein.

As will be understood, the implementation(s) described herein are non-limiting examples, and variations to the technology can be implemented. For instance, one the examples herein is based on having six protection groups of two data portions to be rebalanced among four nodes, and another example has protection groups of four components each to be rebalanced among twelve nodes, but systems having other numbers of protection group components and storage entities can benefit from the technology described herein. Moreover, with respect to storage entities (comprising nodes or storage devices), nodes (each typically having multiple storage devices) are used in the examples described herein; however it is understood that any data storage resource/storage device may be used instead of or in addition to nodes. As such, any of the embodiments, aspects, concepts, structures, functionalities, implementations and/or examples described herein are non-limiting, and the technology may be used in various ways that provide benefits and advantages in computing and data storage technologies in general.

FIG. 1 shows part of a cloud data storage system 100 (such as ECS) comprising a node cluster 102 of storage nodes 104(1)-104(N), in which each node is typically a server configured primarily to serve objects or streamed data events in response to client requests. Such storage systems can employ a Redundant Array of Independent Nodes (RAIN) pattern. The nodes 104(1)-104(1) are coupled to each other via a suitable data communications link comprising interfaces and protocols, such as represented in FIG. 1 by Ethernet block 106. A storage cluster thus has a number of (N) hardware nodes, and each storage node manages a number (M) of disks.

Clients 108 make data system-related requests to the cluster 102, which in general with respect to serving objects, for example, is configured as one large object namespace; there may be on the order of billions of objects maintained in a cluster, for example. To this end, a node such as the node 104(2) (shown enlarged in FIG. 1 as well) generally comprises ports 112 by which clients connect to the cloud storage system. Example ports are provided for requests via various protocols, including but not limited to SMB (server message block), FTP (file transfer protocol), HTTP/HTTPS (hypertext transfer protocol) and NFS (Network File System); further, SSH (secure shell) allows administration-related requests, for example.

Each node, such as the node 104(2), includes an instance of a data storage system; (note however that at least some data service components can be per-cluster, rather than per-node). For example, ECS runs a set of storage services, which together implement storage logic. Services can maintain directory tables for keeping their metadata, which can be implemented as search trees. A blob service maintains an object table (e.g., in various partitions among nodes) that keeps track of objects in the data storage system and generally stores their metadata, including an object's data location information, e.g., within a chunk. There is also a "reverse" directory table (maintained by another service) that keeps a per chunk list of objects that have their data in a particular chunk.

FIG. 1 further represents some additional concepts, in that the user data repository of chunks is maintained in a chunk store 114, managed by another storage service referred to as a chunk manager 116. A chunk table 118 maintains metadata about chunks, e.g., as managed by the chunk manager 116. Chunks of user data are protected by erasure coding, forming protection groups as described herein; (other types of chunks can be protected in other ways, such as by replication). A Redundant Array of Independent Disks (RAID) can be used, which can protect data via mirroring.

As described herein, affinity-based data distribution logic 120 operates to rebalance protection groups comprising related data portions such as data fragments and coding fragments, in a way that tends to avoid the concentration of the same protection groups on the same storage entities (which can be nodes or storage devices such as disks). In one or more implementations, when a protection group needs to be rebalanced, affinity-based data rebalancer logic 120 obtains candidate storage capacity blocks (in candidate storage entities) from a capacity load balancer 122. The affinity-based data distribution logic 120 accesses an affinity data structure 124 (e.g., a matrix) to select storage entities for the protection group, based on affinity levels maintained in the data structure 124, from the candidate entities, and provides the protection group components to an IO load balancer 126, which assigns the components to the allocated capacity blocks.

In FIG. 1, a CPU 130 and RAM 132 are shown for completeness; note that the RAM 130 may comprise at least some non-volatile RAM. The node 104(2) further includes storage devices such as disks 134, comprising hard disk drives and/or solid-state drives, or any other suitable type of storage resource. As can be readily appreciated, components of the data storage system including those described herein can be at various times in any storage device or devices, such as in the RAM 132, in the disks 134, or in a combination of both, for example.

Figure 2:
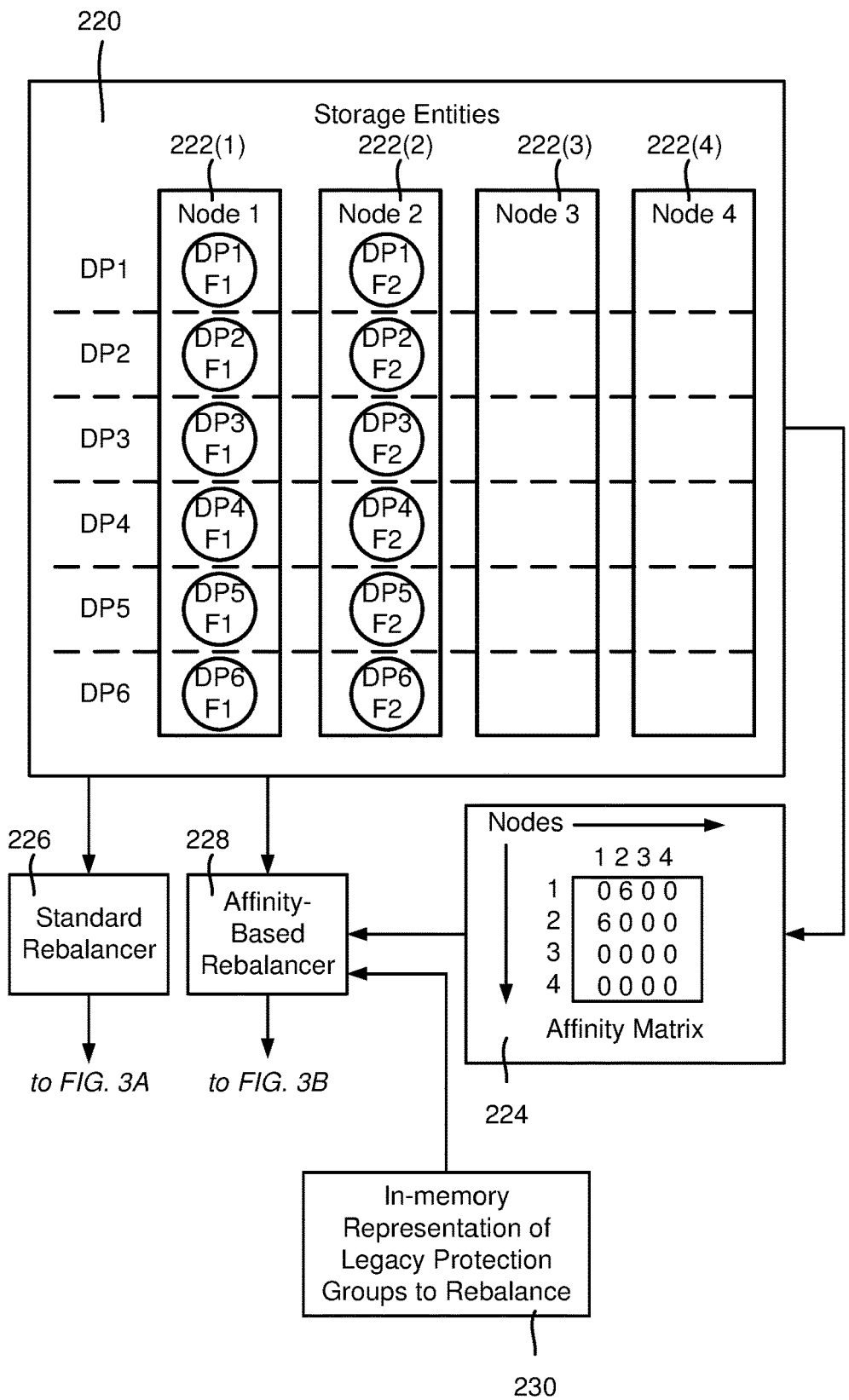
FIGS. 2 and 3A and 3B are example representations of how protection groups can be rebalanced among storage entities (disks or nodes), in accordance with various aspects and implementations of the subject disclosure.
Figure 3A:
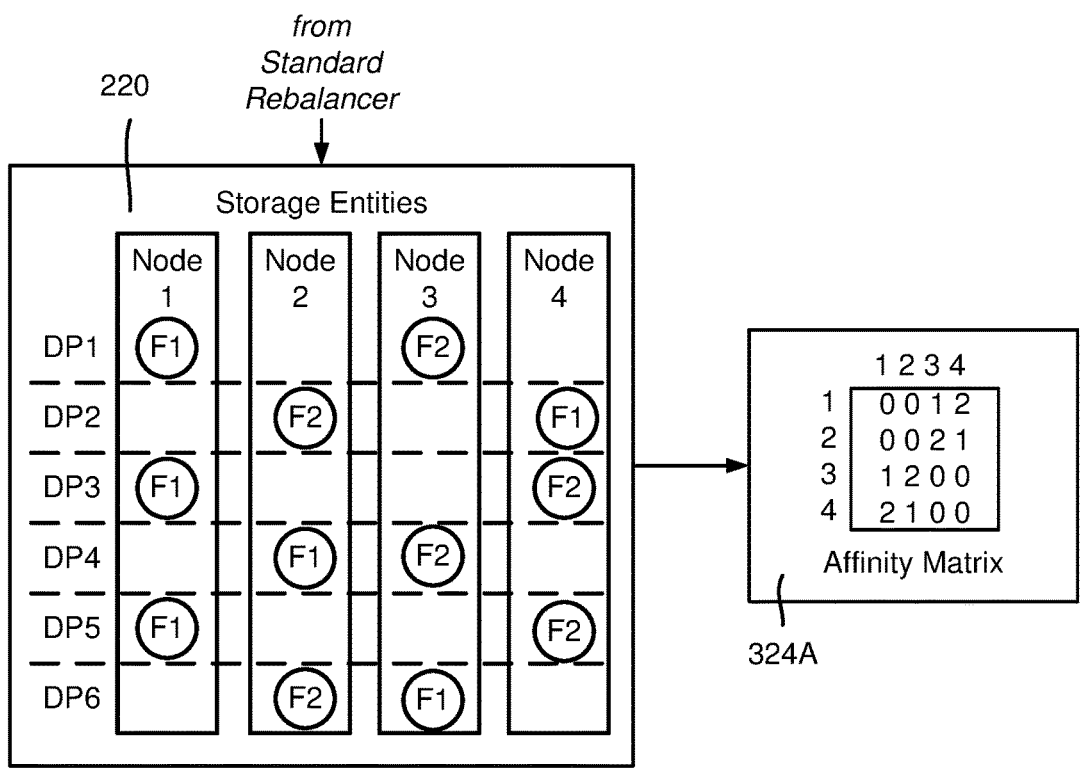
Figure 3B:
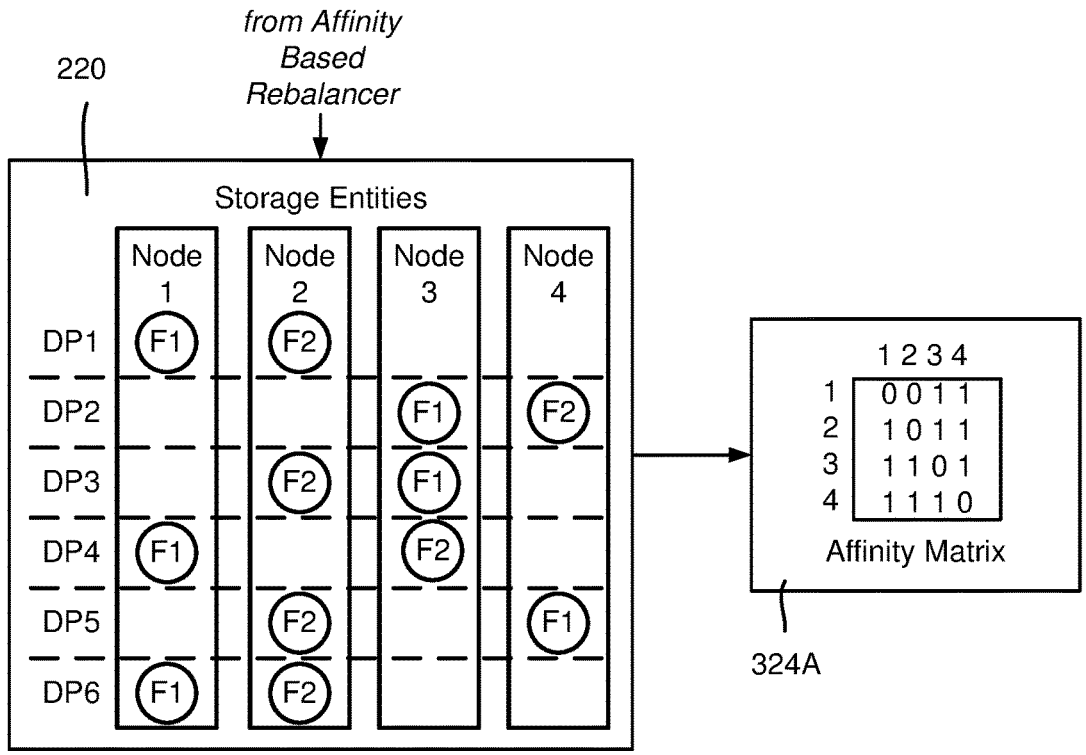

FIGS. 2, 3A and 3B show concepts related to affinity between storage entities, which can be nodes or storage devices (such as disks). In the example FIG. 2, there are four storage entities 220 (nodes in this example, comprising node 1-node 4, labeled 222(1)-222(4). Two of the nodes 222(1) and 222(2) are legacy storage entities, to which two new nodes 222(3) and 222(4) are added, referred as a scale out event.

The storage entities store six protection groups of related data portions, represented by the circled numerals. In this example, the protection groups are protected with basic mirroring; that is, each data portion has been stored as a pair of identical fragments, F1 and F2, and each protection group unites the two related fragments. Thus, for example, there are two data portion fragments DP1F1 and DP1F2 for the protection group (data portion DP1), two data portion fragments DP2F1 and DP2F2 for the protection group (data portion DP2), and so on in FIG. 2.

As can be seen, before rebalancing there is a large affinity level between the node 222(1) and the node 222(2), namely six protection group dependencies; (e.g., if node 1 failed, node 2 has to participate in recovering node 1's six data portions, and vice-versa). The affinity information can be maintained in an affinity dataset, such as an N×N affinity matrix 224, where N (four in this example) is the number of nodes, one column and one row per node. A value $X_{i,j}$ in an affinity a matrix indicates a number of protection groups that have their components in both the i-th and j-th storage entities. Note that $X_{i,j}=X_{j,i}$. Thus, the pair of nodes 1 and 2 have a value of 6 in the affinity matrix 224, ($X_{1,2}=6$ and $X_{2,1}=6$) while other pairs of nodes have zero affinity values. Note that a node does not have an affinity level with itself, and thus $X_{i,j|i=j}=0$.

The scale out event that adds two nodes in this example triggers a data rebalancing, which in general operates to reduce the amount of data on existing storage entities (e.g., nodes) by moving some of their data to the newly added storage entities such that the four nodes of the expanded cluster contain more or less the same amount of data.

FIG. 3A shows the expanded cluster of four nodes after standard rebalancing following a scale-out event. As the number of new nodes equals the number of old nodes, and each data portion has two fragments, each data portion donates one of its fragments to a new node. Capacity load balance is preserved, so fragments to move are taken from different old (legacy) nodes and the fragments are moved to different new nodes.

The new data layout in FIG. 3A has a very good capacity load balance, as each node stores exactly three fragments of different data portions. However, the affinity between nodes that store the data portion's fragments is not particularly level, as the general goal to have all values in the matrix (other than $X_{i,j|i=j}=0$) more or less similar. The affinity matrix can be used to assess the quality of a mutual dependence between cluster nodes, and as can be seen from the updated affinity matrix 324A when standard rebalancing completes, the matrix 324A is not flat/the levels are uneven. For example, nodes 1 and 2 have zero affinity between them, while the affinity between node 1 and node 4 is two. A straightforward rebalancing tends to create uneven affinity levels.

As set forth herein, this affinity matters when one of the nodes fail. In general, the greater affinity between nodes A and B, the greater amount of data recovery work node A needs to do after a failure of node B, and vice versa. Therefore, the technology described herein helps to ensure that the pairs of nodes in a storage system have more or less the same affinity. This way, a data recovery backlog after a node failure is distributed between remaining nodes more evenly, and the recovery process takes less time, which in turn reduces the probability of data loss events.

FIG. 3B shows the difference from FIG. 3A when an affinity-based rebalancer 228 (FIG. 2) as described herein is used instead of the standard rebalancer 226. The capacity load balance in the layout of FIG. 3B looks good, as each nodes stores exactly three fragments of different data portions. However, a significant distinction of this layout from that of FIG. 3A is that the layout of FIG. 3B has data portions that moved fewer than a half of their fragments to the new nodes (e.g. data portion DP1 moved zero fragments), and other data portions that moved more than a half of their fragments to the new nodes (e.g. data portion DP2 moved both fragments). This distinction helps to assure a healthy relationship between cluster nodes at the system level (that is, good distribution of affinity between pairs of nodes). As can be seen, the updated affinity matrix 324B has even levels between pairs of nodes.

Figure 4:
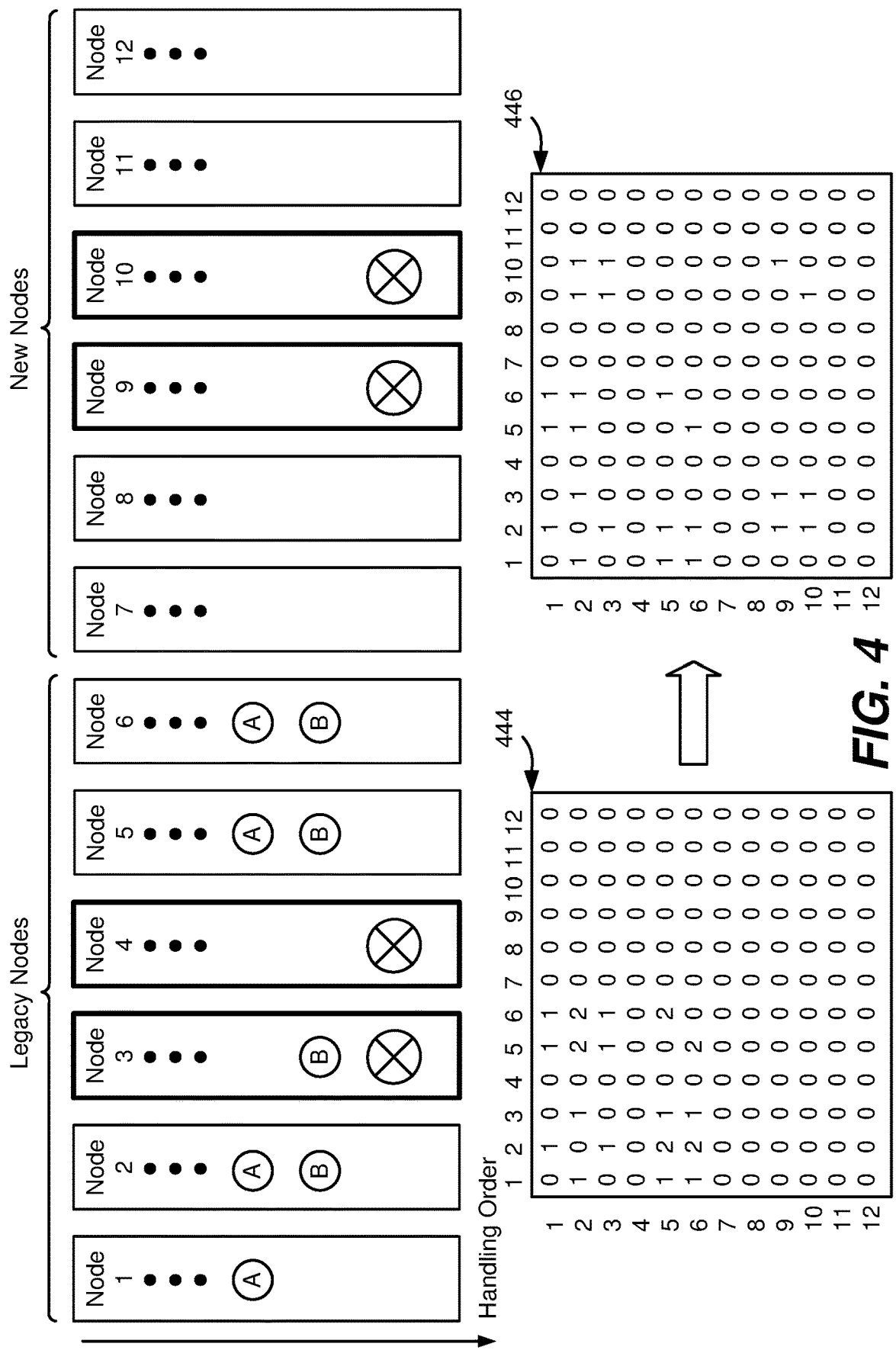
FIGS. 4-6 are example representations of affinity-based rebalancing of a protection group at various stages, in accordance with various aspects and implementations of the subject disclosure.
Figure 5:
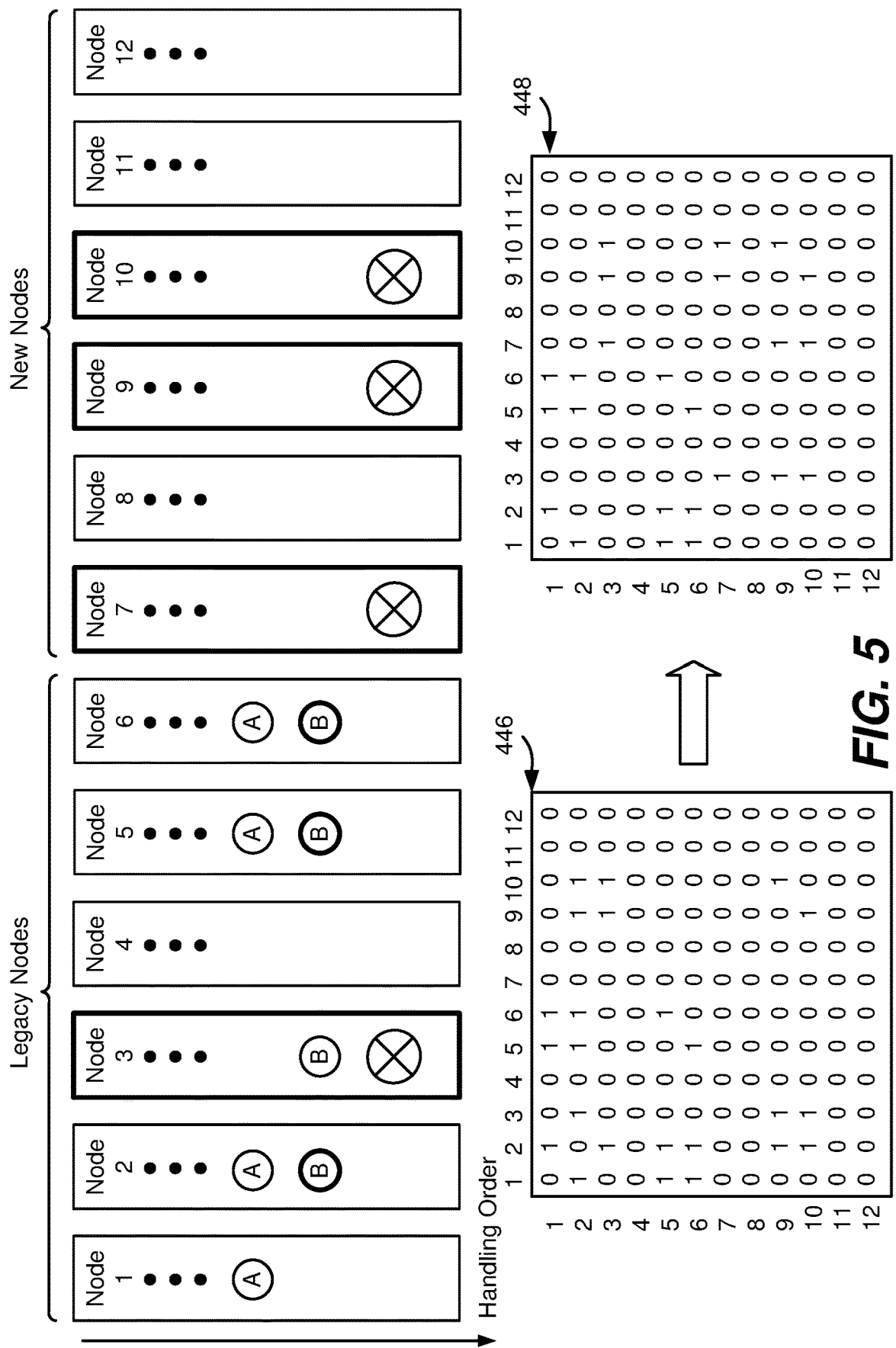
Figure 6:
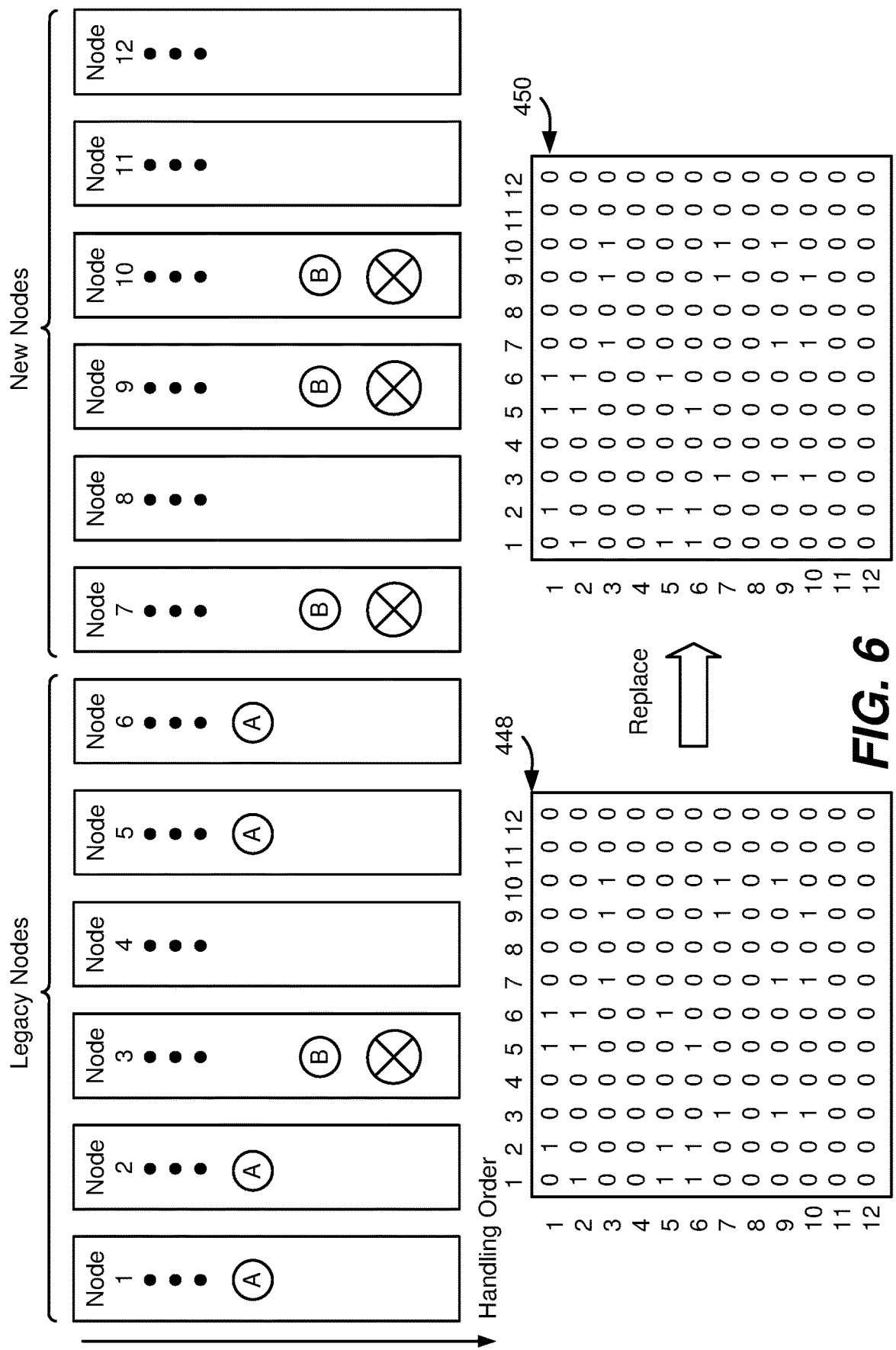

Turning to an example of how the affinity-based rebalancer 228 (FIG. 2) operates, FIGS. 4-6 show load rebalancing of the data protection groups (set) having four components each, in a cluster of twelve nodes that has been expanded from six (legacy) nodes by adding new nodes 7-12.

The affinity-based rebalancer 228 thus starts by expanding (or creating if none exists) an affinity matrix to reflect the expanded cluster. This affinity matrix is to be used to assist data rebalancing as well as handle normal data traffic (e.g., data creation) as well. Note that in this model, a good affinity matrix also means good capacity balance, and it can be understood that free capacity is not going to run out before rebalancing has finished, whereby capacity metrics can be ignored.

The affinity-based rebalancing technology described herein keeps the affinity matrix as flat as possible, while redistributing the components (fragments) of legacy protection groups. As will be understood, affinity-based rebalancing is a stateful process that that assures good mutual disposition of the legacy protection groups and new protection groups.

Once the affinity matrix is obtained, the affinity-based rebalancer 228 obtains an initial layout that improves capacity load balance and maintains good affinity levels. One constraint is that the affinity-based rebalancer 228 does not move legacy fragments between old nodes to level affinity; instead each fragment either remains on its current node or moved to a new node.

A good initial layout for a data portion to rebalance can be found by first creating a working copy 444 (FIG. 4) of the current affinity matrix to work with. This copy can be discarded once a layout (the initial layout or an adjusted version thereof is found as described herein. A first fragment of the data portion can be put to (planned for moving) to the node that has the weakest affinity with other nodes. If there are two or more such nodes, any of them can be chosen.

For the remaining fragments a set of indices of nodes, which are already involved in the layout being creating, can be indicated as the i's indices set. When looking for a node for another fragment, the process detects a node that can accommodate another fragment without violating the standard limitations on data distribution, which is that one node should not store more that ceil(n/N) fragments, where n is the number of fragments in the protection group (data portion), and N is the number of nodes in the expanded cluster. Further, the affinity matrix is accessed to select such a node that has the lowest value $X_{i,j}$, where i does not equal j and i belongs to the i's indices set. Note that j may also belong to the i's set.

Once such a node is determined, the process updates the affinity matrix's copy 444. Note that in case the i's indices set contains multiple indices, multiple values are updated in the matrix copy. The process repeats to find one node for each protection group component (fragment).

As shown in FIG. 2, the affinity based rebalancer 228 keeps (e.g., in RAM) a description of multiple legacy protection groups to find a protection group that has at least some intersection with the good layout. In this example, the legacy protection groups are A and B (two legacy protections groups), however a larger practical number can be maintained in other scenarios.

Based on the handling order as indicated by the downward arrow in FIG. 4, a next legacy protection group to rebalance is A, represented by the four circled A's. The good protection group layout obtained as described above is indicated by the crossed circles in nodes 3, 4, 9 and 10 (which are also highlighted by a darkened border).

However, the new layout does not intersect with protection group A. Group A is thus not an ideal candidate, as the process cannot get a good enough new layout for A without moving fragments between old nodes. Thus, between A and B, the process chooses B because it has one intersection with the good layout (legacy node 3). Protection group B is to be rebalanced before A, then, in this example. Note that if other candidate protection groups are in memory, then one with an even better intersection can be chosen.

To summarize thus far, a good fragment's layout as described above thus can have two parts, namely a first part that references a subset of the old nodes, and a second part that references a subset of the new nodes. The problem with the good layout is that its first part may reference the nodes that have no (or small number of) fragments of the first legacy data portion still to rebalance. The rebalancing process is not supposed to move fragments between two old nodes. Therefore, it was beneficial to find the data portion B that fit into the good layout better than data portion A. Note that a search for the best legacy data portion for a given layout can be expensive with respect to resource consumption, which is why the implementation above keeps information for a small subset of data portions to rebalance in memory, and finds a data portion that fits into the good layout best among the subset of data portions. For each data portion, the process calculates a number of fragments that fit into the good layout without needing moving. The data portion with the greatest number of such fragments wins, which in this example was data portion B. This data portion is to be rebalanced during the current process iteration.

As shown in FIG. 4, the affinity-based rebalancer process further needs to adjust the good layout for B, so as to not to move any of B's fragments from an old node to the node 4 (which is another old node). To this end, the good fragment's layout needs to be adjusted for the data portion to rebalance. The positions within the new nodes as well as the positions within the old nodes that are already occupied by the data portion's fragments will be unchanged in the adjusted layout.

Thus, the process reuses the part of the original good layout that references new nodes (9 and 10), and the part that intersects with the current layout of the legacy protection group to rebalance (node 3). Thus, there are three good locations, meaning that only one more (4−3=1) needs to be determined to replace node 4 in the original good layout. To this end, the process takes another snapshot of the affinity matrix, updates that (affinity matrix 446 in FIG. 4) for the three locations to be used as if two of the moves to the new nodes occurred, and use the above-algorithm in conjunction with the updated affinity matrix 446 to find the fourth location.

The nodes to consider are old nodes that have B's fragments, but are not in the new layout yet (namely nodes 2, 5 and 6), plus any new nodes that are not in the new layout yet (nodes 7, 8, 11 and 12). The process selects a node from this set (nodes 2, 5, 6, 7, 8, 11 and 12) based on keeping the affinity matrix as flat as possible. New position(s) are found using the process for creation of good layouts described above. However this time, the process considers only locations that are currently occupied by the data portion and lie outside the original good layout, that is, nodes 2, 5, 6, 7, 8, 11 and 12. The resulting layout is the adjusted layout. The data portion's fragments that lie outside the adjusted layout are the fragments to be moved to the new nodes.

In the example herein, as shown in FIG. 5 the node that was chosen to replace node 4 is node 7. As can be seen in the updated (for node 7) affinity matrix copy 448, this does not increase any node pairs' affinity level. The non-selected positions in the node set are cancelled, and the copy of the affinity matrix is updated accordingly.

When the adjusted layout is ready, the process moves B's fragments that are outside the adjusted layout (those in nodes 2, 5 and 6, as highlighted via those B's with darkened circles) to nodes/locations within the adjusted layout (to nodes 7, 9 and 10). By the constraint definition, fragments are moved from old nodes to new ones. The result is shown in FIG. 6, including the updated actual affinity matrix 450.

It should be noted that the technology described herein may work in conjunction with a standard data rebalancing engine. To this end, when a storage system detects cluster expansion and initiates data rebalancing, the old cluster nodes, which are the nodes that keep legacy data to rebalance, run through the list of existing data portions to identify data portions to rebalance. These are the data portions that had been created before the expansion. It is also noted that data rebalancing is a resource-demanding operation, and thus is normally throttled down so as to not to severely impact normal data traffic operations.

Based on the technology described herein, the old nodes rebalance the fragments of the legacy data portions, taking into consideration affinity, that is, each particular data portion is rebalanced using the affinity matrix. As each data portion needs to be handled only once, there is a need to divide the data rebalancing scope of work between the old nodes. Referring to a first data fragment of a data portion as a primary fragment, each legacy data portion is handled/rebalanced by the old node that stores the portion's primary fragment.

The rebalancing procedure finishes when all old nodes have rebalanced their data portions to be rebalanced.

It should be noted that there is no need to have one global affinity matrix shared by all the cluster nodes. Instead, each node may use its own local affinity matrix and try to keep it level. Thus, for example, the affinity matrixes in FIGS. 4 to 6 can be those of the node that handled the rebalancing of protection group B. When all the local affinity matrices are good, the global affinity matrix, which is a sum of local affinity matrices, is thus also good.

Figure 7:
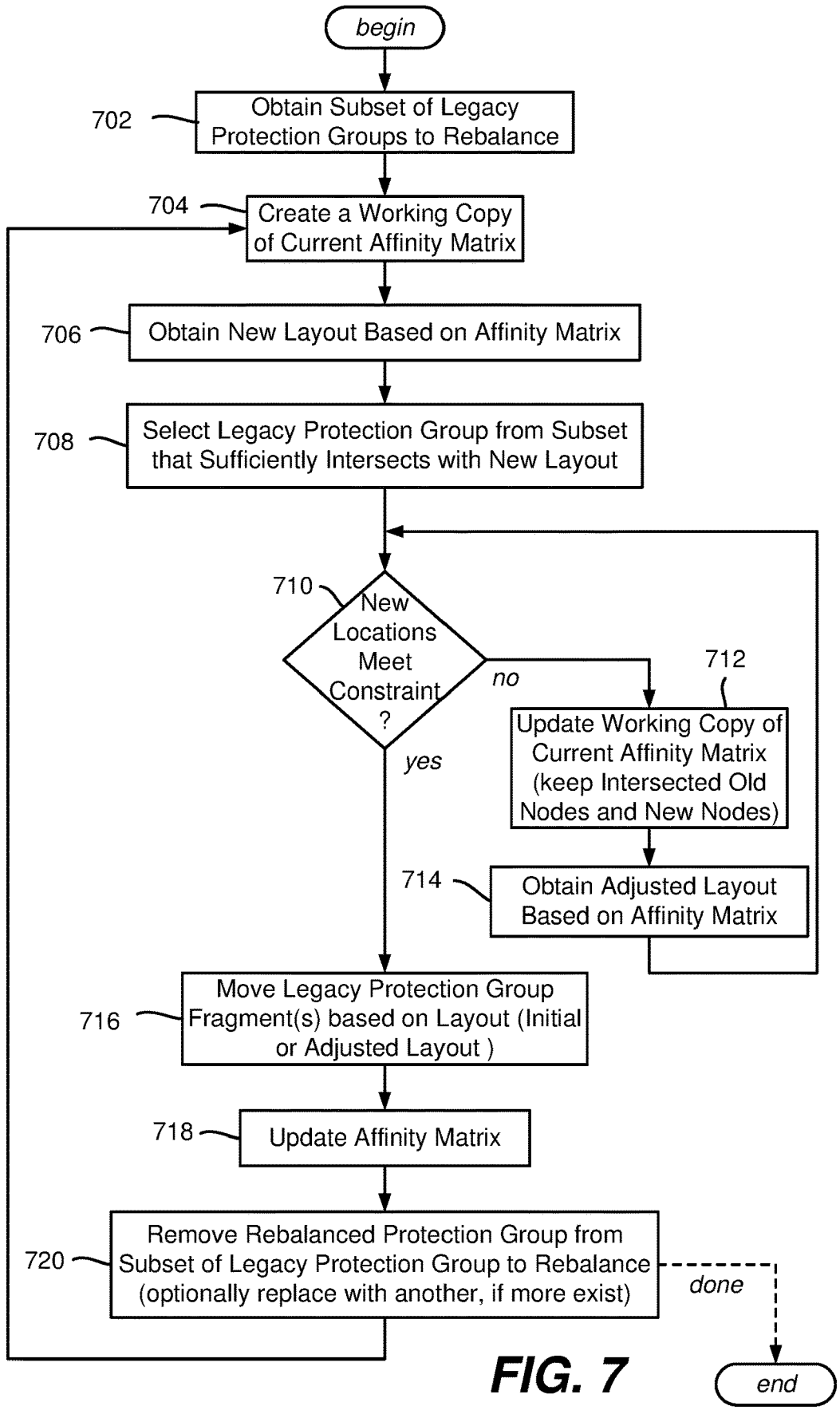
FIG. 7 is flow diagram showing example operations related to affinity-based rebalancing, in accordance with various aspects and implementations of the subject disclosure.

FIG. 7 summarizes example operations related to affinity-based rebalancing as described herein, beginning at operation 702 where the subset of legacy protection groups to rebalance is obtained (maintained in memory). Note that this subset should be based on a practical number of candidate protection groups, which if small, can be the entire set of candidate protection groups. As described above, this subset can contain some (or all) of the primary protection group components of a node, that is, the operations of FIG. 7 can be performed by each node for each protection group with a primary component stored thereon.

Operation 704 creates a working copy of the affinity matrix, and operation 706 obtains a good layout based on the affinity matrix copy as previously detailed herein. Operation 708 selects a legacy protection group from subset that sufficiently intersects with the new, good layout as described herein. Note that this can be an iterative operation that steps through each candidate protection group until the protection group with the best intersection is found, or until one is found that corresponds to only a small adjustment to the initial good layout.

As described above, even with a good layout and good intersection, there may be a need to further adjust the good layout to avoid the constraint (operation 710) of not moving a fragment between one old node and another, as any moves are intended to be to new nodes. If the constraint is not met, operation 712 updates the working copy of the affinity matrix, keeping the intersected nodes and new nodes as good locations, and operation 714 obtains an adjusted layout from among the non-kept nodes, based on the affinity matrix as described above. It is possible that the adjusted layout may still not meet the constraint at operation 710, and thus the constraint is reevaluated, possibly resulting in further updating of the good layout until one is found that meets the constraint.

Once the final good layout is obtained, operation 716 moves the non-intersecting components of the legacy protection group based on the layout. Operation 718 updates the affinity matrix (which as described above can be a per-node matrix that can be combined with other per-node matrices to produce a global affinity matrix).

Operation 720 removes the protection group from the subset of those needing to be rebalanced. Another protection group, if any remain outside the subset, can replace the one removed and the process can repeat. Eventually, the subset will be a full set of those protection groups that remain, which will be reduced until there are no more protection groups to rebalance, and the operations of FIG. 7 can end, e.g., for this node.

Figure 8:
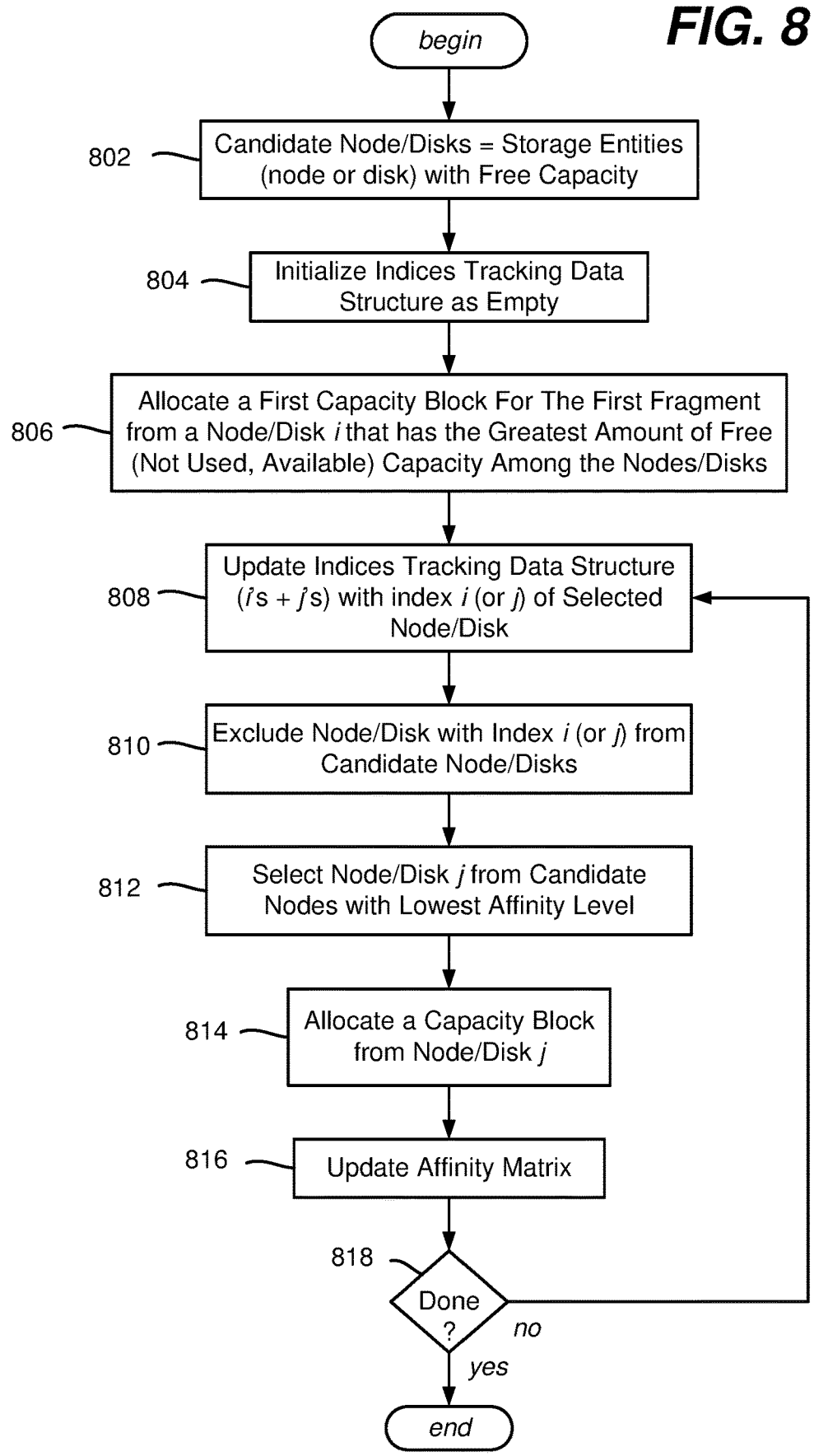
FIG. 8 is a flow diagram showing example operations for obtaining a new affinity-based layout, in accordance with various aspects and implementations of the subject disclosure.

FIG. 8 summarizes one example process for how a good layout can be found, when starting with another protection group, the capacity load balancer 122 of FIG. 1 can provide a set of candidate storage entities (operation 802). An indices tracking data structure that tracks the nodes (or disks) in use with respect to storing protection group components is initialized to empty, as represented by operation 804.

Operation 806 allocates (which can be tentative or only a virtual operation at this time because the layout can be later adjusted) a first capacity block for the first fragment from a node/disk that has the greatest amount of free (not used, available) capacity among the nodes/disks of the candidate set. This information can be obtained from the capacity load balancer 122 of FIG. 1, which provided the candidate set of nodes/disks that may accommodate data/coding fragments of the protection group to be stored.

For example, the indices tracking data structure can comprise a set of indices, i's of the nodes/disks that have donated at least one capacity block for storing the protection group, which via operation 804 is initially empty. Consider that one node contains relatively little data, while the other nodes contain substantially more data (and some nodes may not have sufficient capacity). Then, according to operation 806, the node with relatively little data donates a capacity block for the first fragment of the protection group, whereby the indices tracking data structure contains one value representing the node, and operation 808 of FIG. 8 puts the node identifier as an index in the indices tracking data structure. Operation 810 takes that node from the candidate set.

Operation 812 attempts to find a next capacity block; when allocating a capacity block for another data/coding fragment, operation 812 finds a node/disk j, which has free capacity for at least one data/coding fragment and can accommodate another fragment without violating the standard limitations on data distribution (e.g. one node cannot store more than m data/coding fragments).

Consider that in this example the affinity-based distribution logic needs to store no more than one protection group fragment per node. As set forth above, after excluding the nodes that have already donated a capacity block (as indexed in the indices tracking data structure) from the list of the candidate nodes, the remaining candidate nodes are used; operation 812 selects the node/disk with the lowest value $X_{i,j}$ (has lowest affinity level), where $i \neq j$.

Continuing with the example, another node is selected to accommodate the second fragment of the protection group, with the capacity block allocated at operation 814. After allocating a block from the other node for the second fragment, the copy of the affinity data structure can be updated at operation 816.

The initial good layout is found when capacity blocks are allocated (e.g., virtually for now) for the protection group, as evaluated via operation 818. Note that the operations of FIG. 8 can fail if operation 812 cannot find a node/disk j. In such an event, affinity can be ignored (affinity-based distribution can be deactivated) while allocating capacity thereafter (and optionally warn the client of the situation), although it is alternatively feasible to return a "NoCapacity" error to a data client. This is unlikely when moving legacy data to an expanded number of storage entities.

Returning to FIG. 1, in practical applications the affinity-based data rebalancing logic 120 needs to cooperate with other components such as the capacity load balancer 122 and IO load balancer 124. The three components may work together by having the capacity load balancer 122 provide the set of nodes/disks that may accommodate data/coding fragments of the protection group to be stored. The capacity load balancer 122 is in general not too restrictive; hysteresis or the like (e.g., statistical data) may be used to ensure the set of nodes/disks is wide enough for the further operations.

With this candidate set, the data affinity-based data distribution logic 120 component finds nodes/disks for the data/coding fragments as described herein with reference to FIGS. 7 and 8. Once found, the IO load balancer 126 can assign the data fragments and the coding fragments to the allocated capacity blocks in the way other cluster nodes/disks store similar amounts of (normally hotter) data fragments and similar amount of (normally colder) coding fragments.

Figure 9:
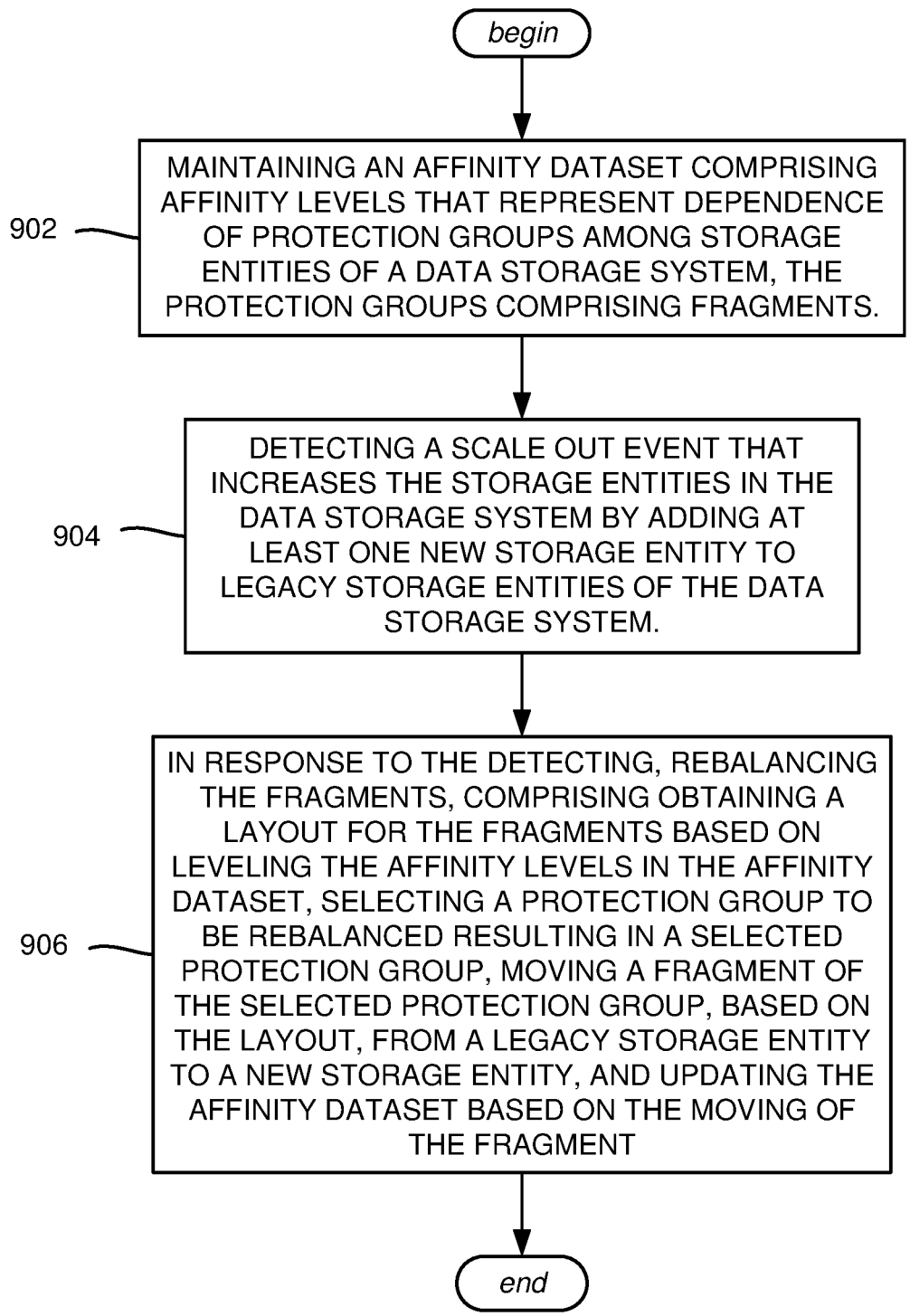
FIG. 9 is a flow diagram showing example operations related to rebalancing fragments of a protection group based on a new layout following a scale-out event, in accordance with various aspects and implementations of the subject disclosure.

One or more aspects can be embodied in a system, such as represented in FIG. 9, and for example can comprise a memory that stores computer executable components and/or operations, and a processor that executes computer executable components and/or operations stored in the memory. Example operations can comprise operation 902, which represents maintaining an affinity dataset comprising affinity levels that represent dependence of protection groups among storage entities of a data storage system, the protection groups comprising fragments. Operation 904 represents detecting a scale out event that increases the storage entities in the data storage system by adding at least one new storage entity to legacy storage entities of the data storage system. Operation 906 represents, in response to the detecting, rebalancing the fragments, comprising obtaining a layout for the fragments based on leveling the affinity levels in the affinity dataset, selecting a protection group to be rebalanced resulting in a selected protection group, moving a fragment of the selected protection group, based on the layout, from a legacy storage entity to a new storage entity, and updating the affinity dataset based on the moving of the fragment.

Obtaining the layout can comprise adjusting a first layout into a second layout to avoid moving the fragment from a first legacy storage entity to a second legacy storage entity.

Selecting the protection group to be rebalanced can comprise determining the selected protection group from among candidate protection groups based on fragment intersection with the layout.

Selecting the protection group to be rebalanced can comprise determining the selected protection group from among candidate protection groups based on avoiding moving the fragment from a first older storage entity to a second older storage entity.

The affinity dataset can comprise a matrix data structure having a first dimension based on a number of storage entities available for storage of the protection groups and a second dimension based on the number of storage entities.

Updating the affinity dataset based on the moving of the fragment can comprise increasing the affinity level between a legacy storage entity that retains a non-moved fragment and the new storage entity.

The storage entities can comprise nodes. The storage entities can comprise storage drives.

Figure 10:
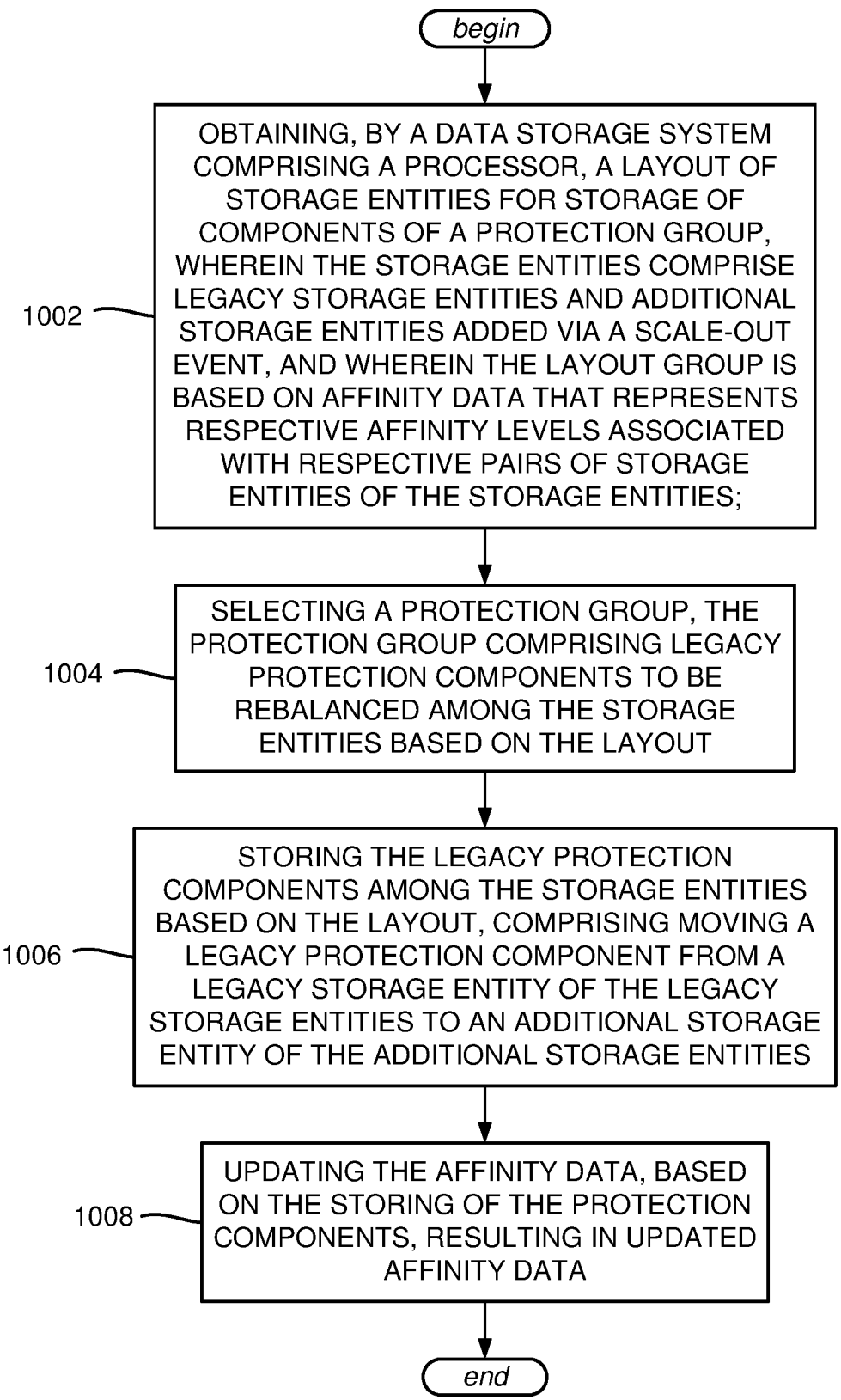
FIG. 10 is a flow diagram showing example operations related to rebalancing a protection group among storage entities based on an affinity-based layout, in accordance with various aspects and implementations of the subject disclosure.

One or more example aspects, such as corresponding to operations of a method, are represented in FIG. 10. Operation 1002 represents obtaining, by a data storage system comprising a processor, a layout of storage entities for storage of components of a protection group, wherein the storage entities comprise legacy storage entities and additional storage entities added via a scale-out event, and wherein the layout group is based on affinity data that represents respective affinity levels associated with respective pairs of storage entities of the storage entities. Operation 1004 represents selecting a protection group, the protection group comprising legacy protection components to be rebalanced among the storage entities based on the layout. Operation 1006 represents storing the legacy protection components among the storage entities based on the layout, comprising moving a legacy protection component from a legacy storage entity of the legacy storage entities to an additional storage entity of the additional storage entities. Operation 1008 represents updating the affinity data, based on the storing of the protection components, resulting in updated affinity data.

Obtaining the layout can comprise determining the layout based on reducing an affinity level of two legacy storage devices.

Obtaining the layout can comprise adjusting a first layout into a second layout to avoid moving the legacy protection component from a first legacy storage entity to a second legacy storage entity.

Adjusting the layout can comprise updating a copy of the affinity data to an updated copy based on an intersection of the legacy protection components of the legacy protection group with a first layout of the storage entities and on first additional storage entities in the first layout, and using the updated copy to replace the second storage entity with a third storage entity in the second layout.

Selecting the protection group can comprise determining an intersection of the legacy protection components of the protection group with the layout of the storage entities.

Aspects can comprise maintaining a group of candidate protection groups; selecting the legacy protection group can comprise determining which of the candidate protection groups intersect with the layout of the storage entities.

Updating the affinity data can comprise incrementing the affinity level between a first legacy storage device that retains a non-moved component of the protection group and the additional storage entity to which the legacy protection component was moved, and decrementing the affinity level between the legacy storage device from which the legacy protection component was moved and the first legacy storage device.

The affinity data can be maintained as a symmetrical matrix data structure of values comprising dimensions based on a number of storage entities that store protection components in the data storage system, and incrementing the affinity level can comprise, for the respective pairs of storage entities, incrementing a respective first matrix value indexed by the first legacy storage device that retains at least one protection component and the additional storage entity to which the legacy protection component was moved.

Figure 11:
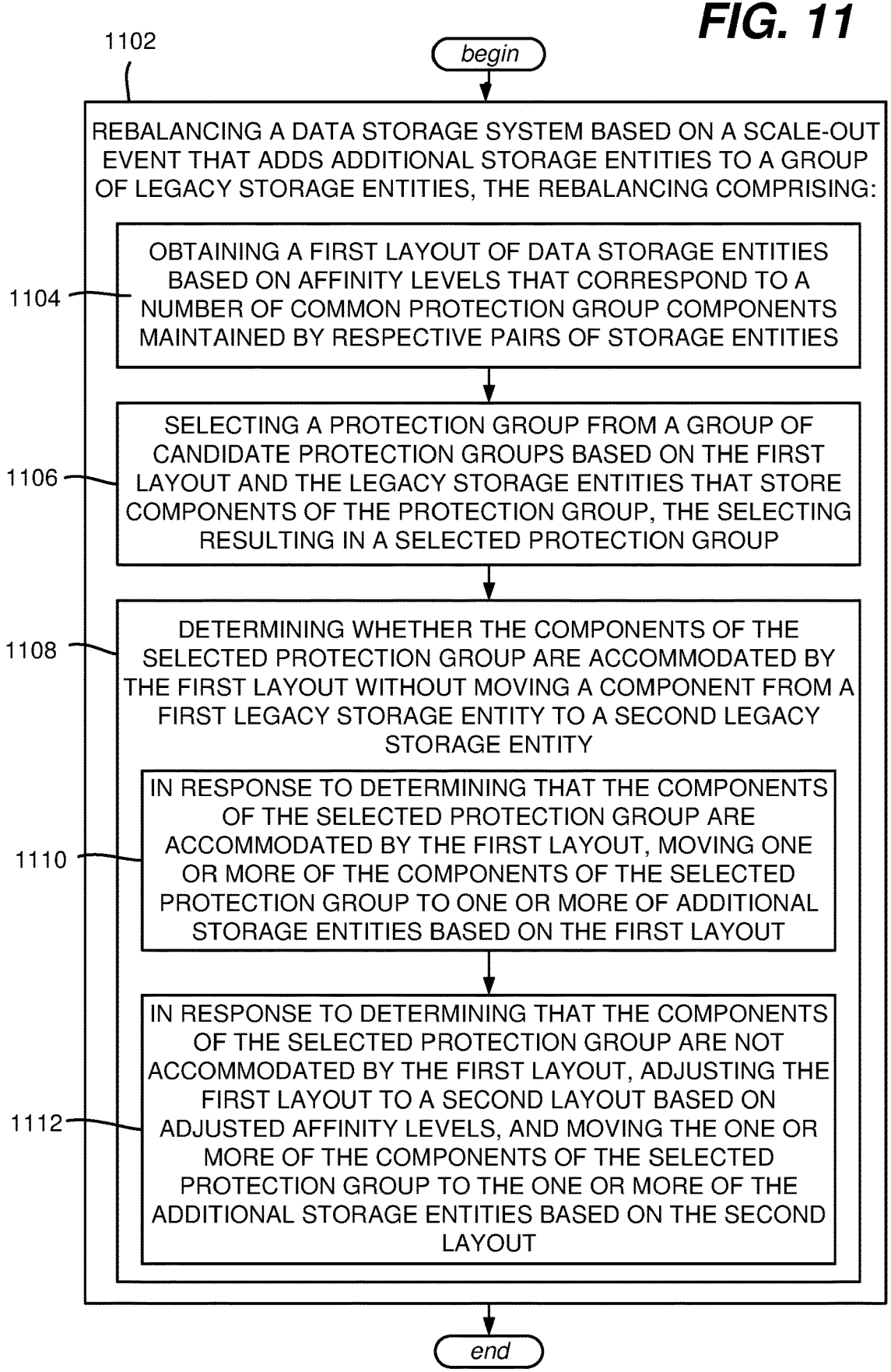
FIG. 11 is a flow diagram showing example operations related to obtaining an affinity-based layout and a protection group, and rebalancing the protection group based on affinity-based layout, in accordance with various aspects and implementations of the subject disclosure

FIG. 11 summarizes various example operations, e.g., corresponding to a machine-readable storage medium, comprising executable instructions that, when executed by a processor of a system, facilitate performance of operations. Operation 1102 represents rebalancing a data storage system based on a scale-out event that adds additional storage entities to a group of legacy storage entities. The rebalancing can comprise operation 1104, which represents obtaining a first layout of data storage entities based on affinity levels that correspond to a number of common protection group components maintained by respective pairs of storage entities. Operation 1106 represents selecting a protection group from a group of candidate protection groups based on the first layout and the legacy storage entities that store components of the protection group, the selecting resulting in a selected protection group. Operation 1108 represents determining whether the components of the selected protection group are accommodated by the first layout without moving a component from a first legacy storage entity to a second legacy storage entity. Operation 1110 represents, in response to determining that the components of the selected protection group are accommodated by the first layout, moving one or more of the components of the selected protection group to one or more of additional storage entities based on the first layout. Operation 1112 represents, in response to determining that the components of the selected protection group are not accommodated by the first layout, adjusting the first layout to a second layout based on adjusted affinity levels, and moving the one or more of the components of the selected protection group to the one or more of the additional storage entities based on the second layout.

Selecting the protection group can comprise determining intersection of the first layout with the legacy storage entities that store the components of the selected protection group.

Adjusting the first layout to the second layout based on the adjusted affinity levels can comprise adjusting a copy of the affinity levels based on the intersection of the first layout with the legacy storage entities that store the components of the selected protection group.

Further operations can comprise updating the affinity levels based on the moving of the one or more of the components.

As can be seen, the technology described herein employs affinity data to facilitate efficient and fast data recovery after hardware failures in an expanded storage cluster. The technology is practical to implement, applicable to virtually all data storage systems, and can be particularly efficient in systems where the number of fragments in a data portion is less than a number of nodes in the expanded cluster.

Figure 12:
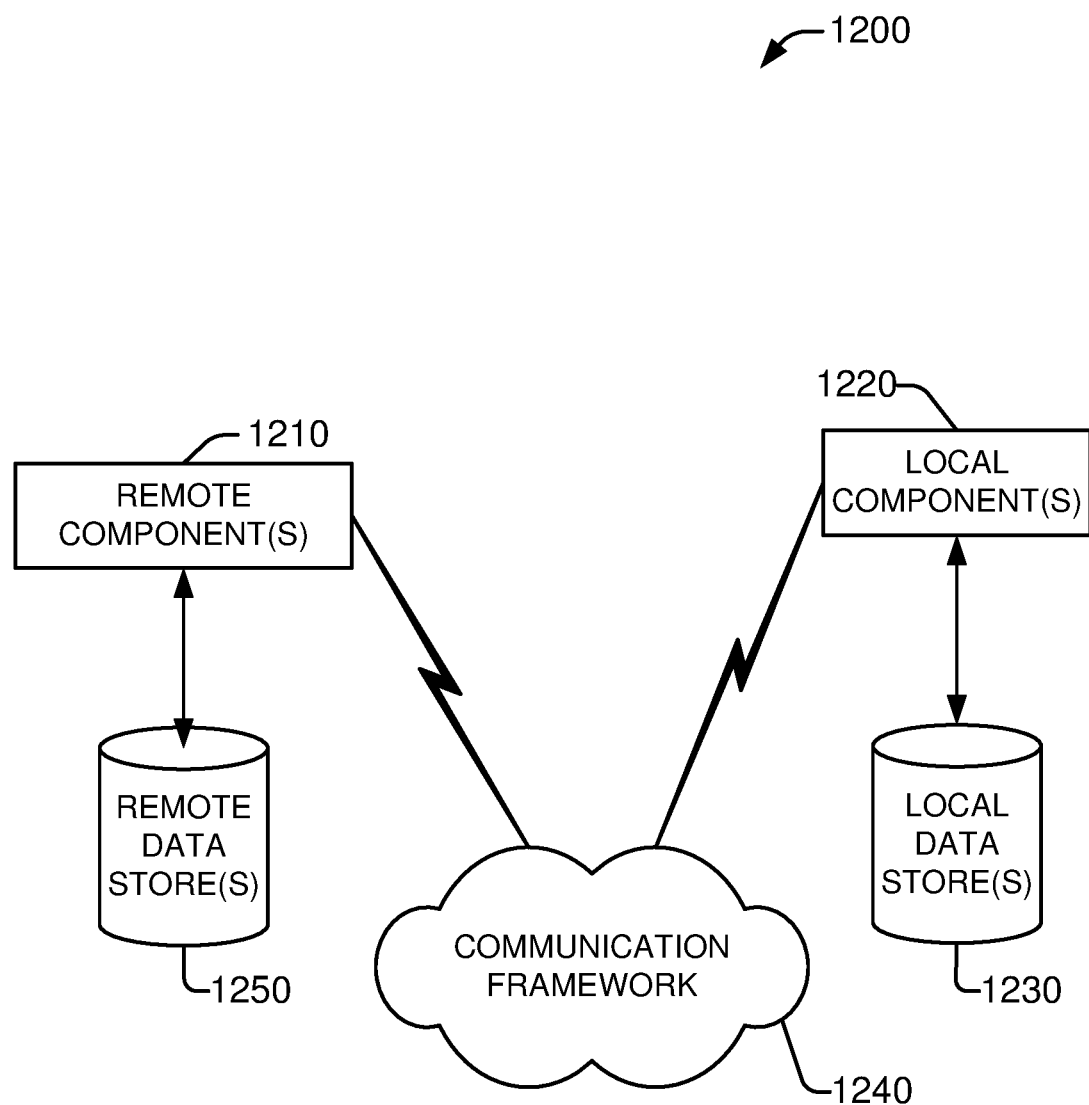
FIG. 12 depicts an example schematic block diagram of a computing environment with which the disclosed subject matter can interact.

FIG. 12 is a schematic block diagram of a computing environment 1200 with which the disclosed subject matter can interact. The system 1200 comprises one or more remote component(s) 1210. The remote component(s) 1210 can be hardware and/or software (e.g., threads, processes, computing devices). In some embodiments, remote component(s) 1210 can be a distributed computer system, connected to a local automatic scaling component and/or programs that use the resources of a distributed computer system, via communication framework 1240. Communication framework 1240 can comprise wired network devices, wireless network devices, mobile devices, wearable devices, radio access network devices, gateway devices, femtocell devices, servers, etc.

The system 1200 also comprises one or more local component(s) 1220. The local component(s) 1220 can be hardware and/or software (e.g., threads, processes, computing devices). In some embodiments, local component(s) 1220 can comprise an automatic scaling component and/or programs that communicate/use the remote resources 1210 and 1220, etc., connected to a remotely located distributed computing system via communication framework 1240.

One possible communication between a remote component(s) 1210 and a local component(s) 1220 can be in the form of a data packet adapted to be transmitted between two or more computer processes. Another possible communication between a remote component(s) 1210 and a local component(s) 1220 can be in the form of circuit-switched data adapted to be transmitted between two or more computer processes in radio time slots. The system 1200 comprises a communication framework 1240 that can be employed to facilitate communications between the remote component(s) 1210 and the local component(s) 1220, and can comprise an air interface, e.g., Uu interface of a UMTS network, via a long-term evolution (LTE) network, etc. Remote component(s) 1210 can be operably connected to one or more remote data store(s) 1250, such as a hard drive, solid state drive, SIM card, device memory, etc., that can be employed to store information on the remote component(s) 1210 side of communication framework 1240. Similarly, local component(s) 1220 can be operably connected to one or more local data store(s) 1230, that can be employed to store information on the local component(s) 1220 side of communication framework 1240.

Figure 13:
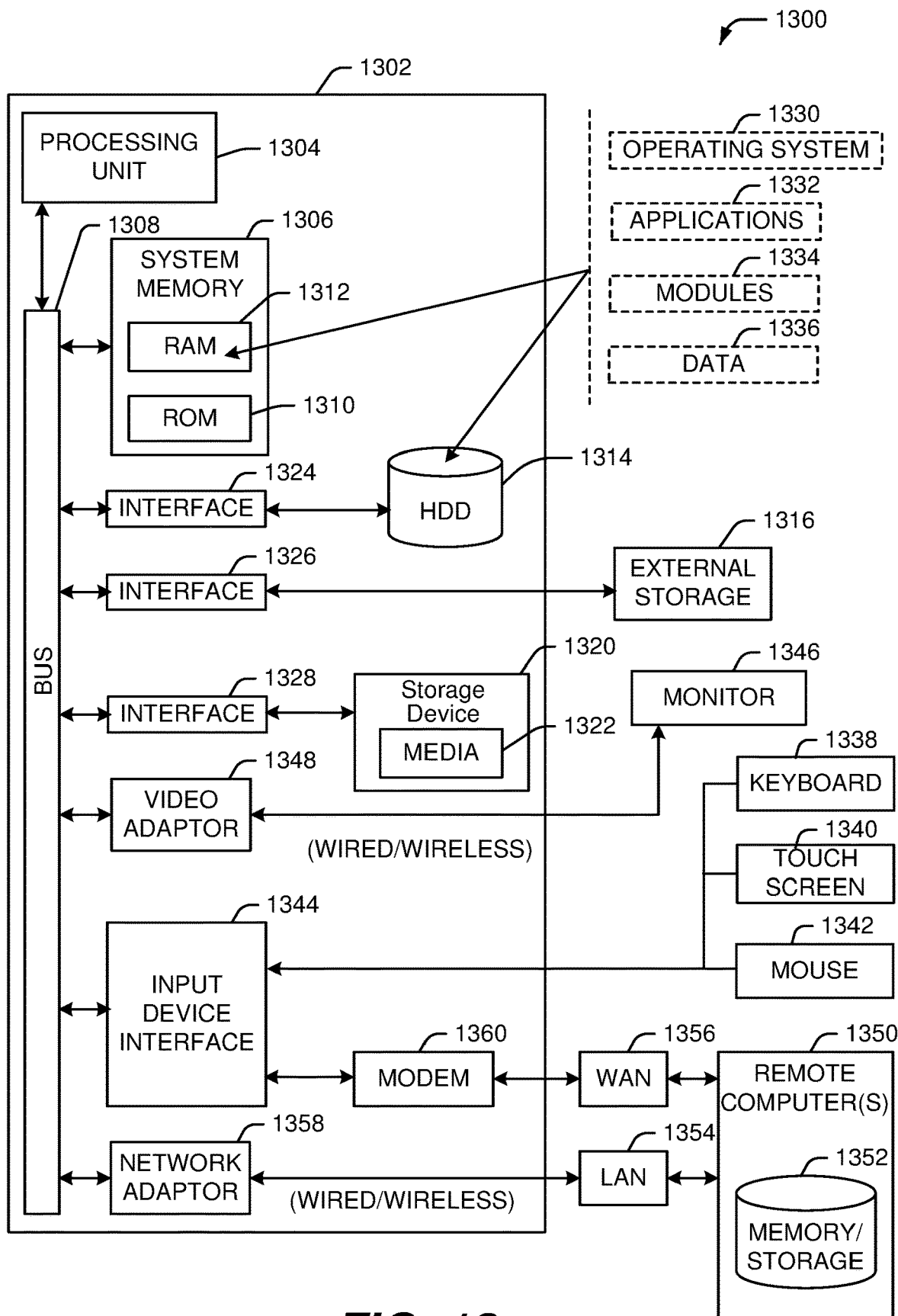
FIG. 13 illustrates an example block diagram of a computing system operable to execute the disclosed systems and methods in accordance with various aspects and implementations of the subject disclosure.

In order to provide additional context for various embodiments described herein, FIG. 13 and the following discussion are intended to provide a brief, general description of a suitable computing environment 1300 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 13, the example environment 1300 for implementing various embodiments of the aspects described herein includes a computer 1302, the computer 1302 including a processing unit 1304, a system memory 1306 and a system bus 1308. The system bus 1308 couples system components including, but not limited to, the system memory 1306 to the processing unit 1304. The processing unit 1304 can be any of various commercially available processors. Dual microprocessors and other multi-processor architectures can also be employed as the processing unit 1304.

The system bus 1308 can be any of several types of bus structure that can further interconnect to a memory bus (with or without a memory controller), a peripheral bus, and a local bus using any of a variety of commercially available bus architectures. The system memory 1306 includes ROM 1310 and RAM 1312. A basic input/output system (BIOS) can be stored in a non-volatile memory such as ROM, erasable programmable read only memory (EPROM), EEPROM, which BIOS contains the basic routines that help to transfer information between elements within the computer 1302, such as during startup. The RAM 1312 can also include a high-speed RAM such as static RAM for caching data.

The computer 1302 further includes an internal hard disk drive (HDD) 1314 (e.g., EIDE, SATA), and can include one or more external storage devices 1316 (e.g., a magnetic floppy disk drive (FDD) 1316, a memory stick or flash drive reader, a memory card reader, etc.). While the internal HDD 1314 is illustrated as located within the computer 1302, the internal HDD 1314 can also be configured for external use in a suitable chassis (not shown). Additionally, while not shown in environment 1300, a solid state drive (SSD) could be used in addition to, or in place of, an HDD 1314.

Other internal or external storage can include at least one other storage device 1320 with storage media 1322 (e.g., a solid state storage device, a nonvolatile memory device, and/or an optical disk drive that can read or write from removable media such as a CD-ROM disc, a DVD, a BD, etc.). The external storage 1316 can be facilitated by a network virtual machine. The HDD 1314, external storage device(s) 1316 and storage device (e.g., drive) 1320 can be connected to the system bus 1308 by an HDD interface 1324, an external storage interface 1326 and a drive interface 1328, respectively.

The drives and their associated computer-readable storage media provide nonvolatile storage of data, data structures, computer-executable instructions, and so forth. For the computer 1302, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1312, including an operating system 1330, one or more application programs 1332, other program modules 1334 and program data 1336. All or portions of the operating system, applications, modules, and/or data can also be cached in the RAM 1312. The systems and methods described herein can be implemented utilizing various commercially available operating systems or combinations of operating systems.

Computer 1302 can optionally comprise emulation technologies. For example, a hypervisor (not shown) or other intermediary can emulate a hardware environment for operating system 1330, and the emulated hardware can optionally be different from the hardware illustrated in FIG. 13. In such an embodiment, operating system 1330 can comprise one virtual machine (VM) of multiple VMs hosted at computer 1302. Furthermore, operating system 1330 can provide runtime environments, such as the Java runtime environment or the .NET framework, for applications 1332. Runtime environments are consistent execution environments that allow applications 1332 to run on any operating system that includes the runtime environment. Similarly, operating system 1330 can support containers, and applications 1332 can be in the form of containers, which are lightweight, standalone, executable packages of software that include, e.g., code, runtime, system tools, system libraries and settings for an application.

Further, computer 1302 can be enable with a security module, such as a trusted processing module (TPM). For instance with a TPM, boot components hash next in time boot components, and wait for a match of results to secured values, before loading a next boot component. This process can take place at any layer in the code execution stack of computer 1302, e.g., applied at the application execution level or at the operating system (OS) kernel level, thereby enabling security at any level of code execution.

A user can enter commands and information into the computer 1302 through one or more wired/wireless input devices, e.g., a keyboard 1338, a touch screen 1340, and a pointing device, such as a mouse 1342. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1304 through an input device interface 1344 that can be coupled to the system bus 1308, but can be connected by other interfaces, such as a parallel port, an IEEE 1394 serial port, a game port, a USB port, an IR interface, a BLUETOOTH® interface, etc.

A monitor 1346 or other type of display device can be also connected to the system bus 1308 via an interface, such as a video adapter 1348. In addition to the monitor 1346, a computer typically includes other peripheral output devices (not shown), such as speakers, printers, etc.

The computer 1302 can operate in a networked environment using logical connections via wired and/or wireless communications to one or more remote computers, such as a remote computer(s) 1350. The remote computer(s) 1350 can be a workstation, a server computer, a router, a personal computer, portable computer, microprocessor-based entertainment appliance, a peer device or other common network node, and typically includes many or all of the elements described relative to the computer 1302, although, for purposes of brevity, only a memory/storage device 1352 is illustrated. The logical connections depicted include wired/wireless connectivity to a local area network (LAN) 1354 and/or larger networks, e.g., a wide area network (WAN) 1356. Such LAN and WAN networking environments are commonplace in offices and companies, and facilitate enterprise-wide computer networks, such as intranets, all of which can connect to a global communications network, e.g., the Internet.

When used in a LAN networking environment, the computer 1302 can be connected to the local network 1354 through a wired and/or wireless communication network interface or adapter 1358. The adapter 1358 can facilitate wired or wireless communication to the LAN 1354, which can also include a wireless access point (AP) disposed thereon for communicating with the adapter 1358 in a wireless mode.

When used in a WAN networking environment, the computer 1302 can include a modem 1360 or can be connected to a communications server on the WAN 1356 via other means for establishing communications over the WAN 1356, such as by way of the Internet. The modem 1360, which can be internal or external and a wired or wireless device, can be connected to the system bus 1308 via the input device interface 1344. In a networked environment, program modules depicted relative to the computer 1302 or portions thereof, can be stored in the remote memory/storage device 1352. It will be appreciated that the network connections shown are example and other means of establishing a communications link between the computers can be used.

When used in either a LAN or WAN networking environment, the computer 1302 can access cloud storage systems or other network-based storage systems in addition to, or in place of, external storage devices 1316 as described above. Generally, a connection between the computer 1302 and a cloud storage system can be established over a LAN 1354 or WAN 1356 e.g., by the adapter 1358 or modem 1360, respectively. Upon connecting the computer 1302 to an associated cloud storage system, the external storage interface 1326 can, with the aid of the adapter 1358 and/or modem 1360, manage storage provided by the cloud storage system as it would other types of external storage. For instance, the external storage interface 1326 can be configured to provide access to cloud storage sources as if those sources were physically connected to the computer 1302.

The computer 1302 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

While the embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the various embodiments are not to be limited to any single implementation, but rather is to be construed in breadth, spirit and scope in accordance with the appended claims.

What is claimed is:

1. A system, comprising:
   a processor, and
   a memory that stores executable instructions that, when executed by the processor, facilitate performance of operations, the operations comprising:
      obtaining an affinity dataset comprising affinity levels that represent dependence of protection groups among storage entities of a data storage system, the protection groups comprising fragments, wherein the affinity dataset comprises a matrix data structure having a first dimension based on a number of storage entities and a second dimension based on a portion of the number of storage entities available for storage of the protection groups;
      detecting a scale out event that increases the storage entities in the data storage system by adding at least one new storage entity to legacy storage entities of the data storage system; and
      in response to the detecting, rebalancing the fragments, comprising obtaining a layout for the fragments based on leveling the affinity levels in the affinity dataset, selecting a protection group to be rebalanced resulting in a selected protection group, moving a fragment of the selected protection group, based on the layout, from a legacy storage entity to a new storage entity, and updating the affinity dataset based on the moving of the fragment.

2. The system of claim 1, wherein the obtaining the layout comprises adjusting a first layout into a second layout to avoid moving the fragment from a first legacy storage entity to a second legacy storage entity.

3. The system of claim 1, wherein the selecting the protection group to be rebalanced comprises determining the selected protection group from among candidate protection groups based on fragment intersection with the layout.

4. The system of claim 1, wherein the selecting the protection group to be rebalanced comprises determining the selected protection group from among candidate protection groups based on avoiding moving the fragment from a first older storage entity to a second older storage entity.

5. The system of claim 1, wherein the updating the affinity dataset based on the moving of the fragment comprises increasing the affinity level between a legacy storage entity that retains a non-moved fragment and the new storage entity.

6. The system of claim 1, wherein the storage entities comprise nodes.

7. The system of claim 1, wherein the storage entities comprise storage drives.

8. A method, comprising:
   obtaining, by a data storage system comprising a processor, a layout of storage entities for storage of components of a protection group, wherein the storage entities comprise legacy storage entities and additional storage entities added via a scale-out event, and wherein the layout group is based on affinity data that represents respective affinity levels associated with respective pairs of storage entities of the storage entities, wherein the affinity data employs a data structure having a first dimension based on a number of storage entities and a second dimension based on a portion of the number of storage entities available for storage of the protection group;
   selecting the protection group, the protection group comprising legacy protection components to be rebalanced among the storage entities based on the layout;
   storing the legacy protection components among the storage entities based on the layout, comprising moving a legacy protection component from a legacy storage entity of the legacy storage entities to an additional storage entity of the additional storage entities; and
   updating the affinity data, based on the storing of the protection components, resulting in updated affinity data.

9. The method of claim 8, wherein the obtaining the layout comprises determining the layout based on reducing an affinity level of two legacy storage devices.

10. The method of claim 8, wherein the obtaining the layout comprises adjusting a first layout into a second layout to avoid moving the legacy protection component from a first legacy storage entity to a second legacy storage entity.

11. The method of claim 10, wherein the adjusting the layout comprises updating a copy of the affinity data to an updated copy based on an intersection of the legacy protection components of the legacy protection group with a first layout of the storage entities and on first additional storage entities in the first layout, and using the updated copy to replace the second storage entity with a third storage entity in the second layout.

12. The method of claim 8, wherein the selecting the protection group comprises determining an intersection of the legacy protection components of the protection group with the layout of the storage entities.

13. The method of claim 8, further comprising maintaining a group of candidate protection groups, and wherein the selecting the legacy protection group comprises determining which of the candidate protection groups intersect with the layout of the storage entities.

14. The method of claim 10, wherein the updating the affinity data comprises incrementing the affinity level between a first legacy storage device that retains a non-moved component of the protection group and the additional storage entity to which the legacy protection component was moved, and decrementing the affinity level between the legacy storage device from which the legacy protection component was moved and the first legacy storage device.

15. The method of claim 14, wherein the affinity data is maintained as a symmetrical matrix data structure of values, and wherein the incrementing the affinity level comprises, for the respective pairs of storage entities, incrementing a respective first matrix value indexed by the first legacy storage device that retains at least one protection component and the additional storage entity to which the legacy protection component was moved.

16. A non-transitory machine-readable medium, comprising executable instructions that, when executed by a processor, facilitate performance of operations, the operations comprising:
- rebalancing a data storage system based on a scale-out event that adds additional storage entities to a group of legacy storage entities, the rebalancing comprising:
  - obtaining a first layout of data storage entities based on affinity levels that correspond to a number of common protection group components maintained by respective pairs of storage entities;
  - selecting a protection group from a group of candidate protection groups based on the first layout and the legacy storage entities that store components of the protection group, the selecting resulting in a selected protection group;
  - determining whether the components of the selected protection group are accommodated by the first layout without moving a component from a first legacy storage entity to a second legacy storage entity, and
  - in response to determining that the components of the selected protection group are accommodated by the first layout, moving one or more of the components of the selected protection group to one or more of additional storage entities based on the first layout; and
  - in response to determining that the components of the selected protection group are not accommodated by the first layout, adjusting the first layout to a second layout based on adjusted affinity levels, and moving the one or more of the components of the selected protection group to the one or more of the additional storage entities based on the second layout.

17. The non-transitory machine-readable medium of claim 16, wherein the selecting the protection group comprises determining intersection of the first layout with the legacy storage entities that store the components of the selected protection group.

18. The non-transitory machine-readable medium of claim 17, wherein the adjusting the first layout to the second layout based on the adjusted affinity levels comprises adjusting a copy of the affinity levels based on the intersection of the first layout with the legacy storage entities that store the components of the selected protection group.

19. The non-transitory machine-readable medium of claim 16, wherein the operations further comprise, updating the affinity levels based on the moving of the one or more of the components.

20. The non-transitory machine-readable medium of claim 16, wherein the obtaining the first layout comprises determining the first layout based on reducing an affinity level of two legacy storage devices.

* * * * *